(12) United States Patent
Ludwig et al.

(10) Patent No.: US 7,960,932 B2
(45) Date of Patent: Jun. 14, 2011

(54) METHOD FOR CONTROLLING AN ELECTRICAL DOOR DRIVE

(75) Inventors: Heinz Ludwig, Garbsen (DE); Guido Sonntag, Gehrden (DE); Hans-Wilhelm Wilken, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 536 days.

(21) Appl. No.: 12/150,014

(22) Filed: Apr. 24, 2008

(65) Prior Publication Data

US 2008/0263964 A1  Oct. 30, 2008

(30) Foreign Application Priority Data

Apr. 26, 2007 (DE) .......................... 10 2007 019 798

(51) Int. Cl.
  *H02P 7/00* (2006.01)
(52) U.S. Cl. .................... 318/434; 318/466; 318/400.4; 318/286
(58) Field of Classification Search .................. 318/563, 318/564, 565, 603, 604, 432, 433, 434, 466, 318/400.4, 282, 286; 49/26, 28, 29, 118
See application file for complete search history.

(56) References Cited

U.S. PATENT DOCUMENTS

| | | | | |
|---|---|---|---|---|
| 5,131,506 A | * | 7/1992 | Mizuno et al. | 187/316 |
| 5,525,876 A | * | 6/1996 | Filippi | 318/282 |
| 5,734,245 A | * | 3/1998 | Terashima et al. | 318/453 |
| 5,950,364 A | * | 9/1999 | Hormann | 49/26 |
| 6,118,243 A | * | 9/2000 | Reed et al. | 318/468 |
| 6,548,979 B2 | * | 4/2003 | Boisvert et al. | 318/469 |
| 6,936,984 B2 | * | 8/2005 | Wilson | 318/280 |
| 7,359,783 B2 | * | 4/2008 | Vives et al. | 701/49 |
| 7,579,802 B2 | * | 8/2009 | Boisvert et al. | 318/466 |
| 2006/0197481 A1 | * | 9/2006 | Hotto et al. | 318/280 |

FOREIGN PATENT DOCUMENTS

| | | |
|---|---|---|
| DE | 4316898 C2 | 3/1995 |
| DE | 19628238 C2 | 1/1999 |
| DE | 19847080 A1 | 4/2000 |

* cited by examiner

*Primary Examiner* — Walter Benson
*Assistant Examiner* — Thai Dinh

(57) ABSTRACT

Disclosed is a method for controlling an electrical door drive by means of which the door drive is switched off if the maximum torque is overshot and/or a defined nominal closing rate of the door is undershot as a result of the door drive being obstructed. In order to reliably prevent injuries and damage to people and objects in the event of a functional failure of the safety control system, and in order to nevertheless reliably block or reverse the door, it is proposed that pulse monitoring be carried out on the door drive, for redundant obstruction identification.

4 Claims, 1 Drawing Sheet

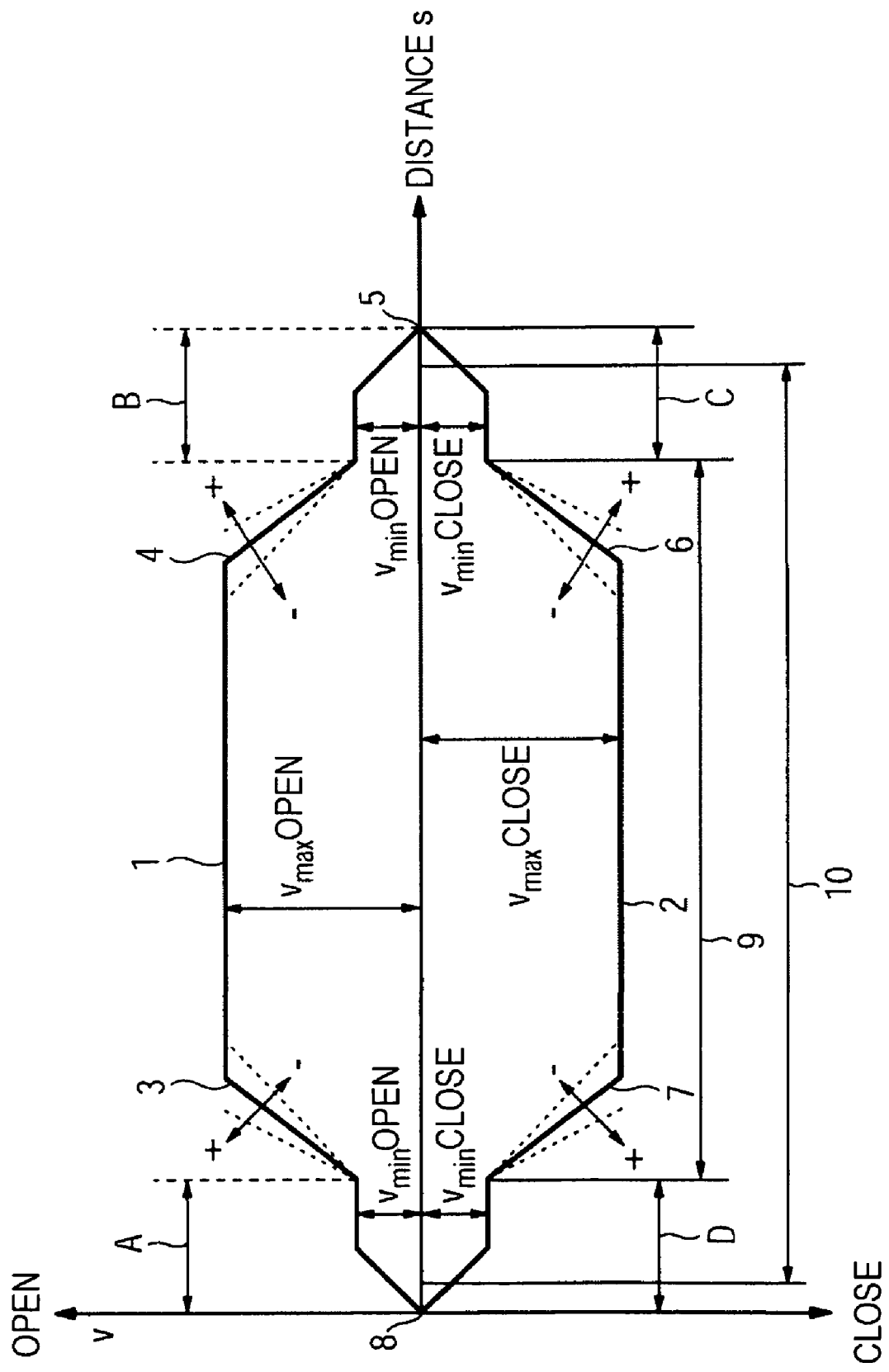

METHOD FOR CONTROLLING AN ELECTRICAL DOOR DRIVE

CROSS REFERENCE TO RELATED APPLICATIONS

This application claims the benefits of German application No. 10 2007 019 798.7 filed Apr. 26, 2007 and is incorporated by reference herein in its entirety.

FIELD OF INVENTION

The invention relates to a method for controlling an electrical door drive, in which, during a reading-in process, the time profile of the drive torque of the door drive is determined and the maximum permissible torques for the opening and closing processes are derived from this and are compared with actual torques occurring during operation, with the door drive being switched off if the maximum torque is exceeded and/or a defined nominal closing rate of the door is undershot, because the door drive is obstructed.

BACKGROUND OF THE INVENTION

Methods such as these are known and are used for door drives, for example for elevator doors. Where the expression door is used in the following text, then this always covers any type of doors or gates without this being expressly mentioned in the text. Methods of this generic type are used in order to ensure, particularly when the door is being closed, that people located in the closing area are not injured and/or objects are not damaged. The drives are therefore controlled such that, if the door is blocked or obstructed by an obstruction, the drive motor or motors is or are stopped in good time so that there is no risk of injury and damage.

It is known, for example from DE 196 28 238 C2, for the door drive to be rendered inoperative via a so-called force switch-off. For this purpose, the closing force required to close the door is measured over the closing movement, and is stored, during a measurement run. The closing force is normally measured by determining the torque required by the electrical door drive motor during at least one measurement process at a defined closing rate, so that the force profile and the speed profile of the door can be determined during the closing and opening movements, from the measured values. The closing torque required to close the door and the maximum permissible closing torque can be determined from the measured values at every point during the closing movement of the door and, if these are exceeded, during operation, this leads to the door drive motor being switched off.

For understandable reasons, there is an aim to keep the response times of the door drive motor switch-off as short as possible in order to reduce the closing force immediately to zero if the door is blocked, and possibly to initiate reversal of the door closing movement. The door movement processes do not take place at a uniform speed, and in fact acceleration and braking processes are the rule at the start and at the end of the closing and opening movements.

The speed profile while the door is being closed can likewise be determined with the aid of measurement runs, and can be read into the memory for the door control system. Discrepancies from the stored speed profile during door operation may be an indication of a disturbance, for example blocking of the door closing movement.

Adaptation of the motor torque (current consumption) and speed of the closing movement can in this case provide more accurate results than simple monitoring of the closing force of the door, and can therefore ensure that normal fluctuations in the motor torque, for example in the event of the door guides becoming dirty, are identified and taken into account without this immediately leading to the drive being switched off.

Since door control systems of the described type always present a considerable risk, in particular to people who are located in the closing area of the door, in the event of malfunctions when obstruction blocking occurs, the aim is to ensure that, in the event of a functional failure of the safety control system, of whatever type, a redundant system is provided to reliably prevent injuries and damage to people and objects.

SUMMARY OF INVENTION

Against the background of the described problems, the invention is based on the object of improving the known door control system such that, in the event of a functional failure of obstruction identification which is provided, blocking or reversing of the door is nevertheless ensured during the door closing process, thus making it possible to avoid any damage.

According to the invention, in order to achieve the object, an improved method is proposed for controlling an electrical door drive, in which pulse monitoring of the door drive is carried out over a time period for redundant obstruction identification. This not only shortens the response time of the control system but creates an additional safety system, in a simple form, such that, in the event of failure of the system or of the other systems, its or their function is taken over. An obstruction can be identified quickly in the door, with the motor being switched off or reversed, by monitoring the pulses of the door drive motor before any damage or injury can occur.

The door drive motor is preferably provided with an incremental transmitter for pulse monitoring of the door drive, which incremental transmitter triggers a signal to switch off and/or to reverse the door drive motor on overshooting a defined time interval between the increments read in by the incremental transmitter encoder. Incremental transmitters such as these may be magnetic or photoelectric. The time intervals between the increments read in by the encoder are known on the basis of the predetermined speed profiles during closing of the door. If the time intervals between the increments that are read in exceed defined values or the encoder does not detect any increments at all, then this is an indication of an obstruction in the closing path of the door, leading to the door drive being switched off for safety.

In order to prevent the door drive from being switched off unnecessarily, the invention also provides that the door drive motor be switched off only when the following conditions occur at the same time:

a demand to close or open the door exists,
the door is not at its end positions, and
no increments are detected by the incremental transmitter encoder within a defined time.

This ensures that the only obstructions that are identified are those which occur during actual operation, that is to say opening and closing. For example, no signals are detected which occur in the door limit positions where, of course, the motor is likewise stationary and no increments can be detected.

A further feature of the invention provides for the door drive motor to be switched off as soon as no increments are detected by the encoder within a variable time from 100 ms to 300 ms. The interval during which the switch-off signal for the door drive motor is triggered is variable and can be adapted to meet the local requirements.

The process of switching off the door drive motor initiated by the pulse monitoring is preferably subordinate to the motor being switched off via the door drive torque. This results in a real redundant system which acts if the normal door control system fails, and replaces the failed control system which should have acted, for example, via the motor torque or the current drawn by the door drive motor.

The invention provides duplicated safety in a simple form for identification of an obstruction, with the aid of the lower-level pulse monitoring. If the door does not identify an obstruction from the conditions of motor current and speed monitoring, this will be detected at the latest after an adjustable time via the conditions of pulse monitoring, so that the door control system can in any case stop or reverse the motor.

BRIEF DESCRIPTION OF THE DRAWINGS

The method according to the invention will be explained with reference to the drawing FIGURE, The FIGURE shows a speed/distance diagram for the closing and opening movement of a door according to the invention, using a Cartesian coordinate system.

The speed v is plotted on the ordinate and the distance s on the abscissa, with or over which, respectively, the door moves. The distance-speed curves 1 for the opening process and 2 for the closing process of the door are obtained in a corresponding manner.

DETAILED DESCRIPTION OF INVENTION

The speed curve 1 for the opening process of the door is plotted above the abscissa, and should be read from left to right. As can be seen, after starting, the door moves from the closed position 8 after a short acceleration phase, first of all at a reduced speed $v_{min}$OPEN over the area A, in which the door leaf is opened in order then to be accelerated to the selected door speed $v_{max}$OPEN. The acceleration is variable, as is indicated by the dashed lines, annotated + and −, on both sides of the acceleration ramp 3. Towards the end of the movement at the speed $v_{max}$OPEN, the door drive once again switches back via a deceleration ramp 4, which is likewise adjustable, to creeping movement B at the speed $v_{min}$OPEN, and the opening process ends with the door in the open position at 5 at the end of the creeping movement B.

The door closing process is shown under the abscissa. The speed profile 2 is now from right to left. In this case as well, the door closing process starts from the position 5 by a creeping movement C at the speed $v_{min}$CLOSE, before being accelerated over the variable acceleration ramp 6 to the door closing speed 2 $v_{max}$CLOSE. At the end of the closing movement, the door speed $v_{min}$CLOSE to close the door leaf is once again decelerated over the deceleration ramp 7 to a creeping movement D at the speed $v_{min}$CLOSE, at the end of which the closing movement is once again decelerated to rest at 8.

In the area 9 between the end of the creeping movement C during closure of the door and the start of the creeping movement D in order to close the door leaf at the end of the door closing movement, the following conditions must be satisfied if an obstruction is identified during the door closing movement, in order to switch off the door drive via the drive motor current and speed monitoring:

a demand to close or open the door exists, the maximum speed value reached during the current closing movement is undershot, the nominal speed value at the current position is greater than the actual, the measured motor current is greater than a variable current limit value, the door is not within the low-speed range.

The following conditions must be satisfied in the area 10 directly between the two limit positions of the door, in order to switch off the door drive via the incremental transmitter:

a demand to close or open the door exists, the door is not at its limit positions, and no increments are detected by the incremental transmitter encoder within a defined time (for example 100 ms or 300 ms).

Therefore, if the obstruction is not identified or detected via the first conditions, the second condition becomes applicable, possibly after a time delay, and the drive is stopped or reversed with the aid of the signal monitoring at the drive motor. The system also allows all possible types of blocking to be detected, both soft and sudden blocking.

The invention claimed is:

1. A method for controlling an electrical door drive, comprising:

determining a time profile of a drive torque of an electrical door drive during a reading-in process;

deriving a maximum permissible torque for an opening process and a closing process from the determined time profile of the drive torque;

comparing the maximum permissible torques with actual torques occurring during operation;

switching off the door drive when the maximum torque is exceeded and/or a defined nominal closing rate of the door is undershot, because the door drive is obstructed, wherein pulse monitoring is carried out on the door drive over a time period for redundant obstruction identification, wherein, for the pulse monitoring of the door drive, a door drive motor is provided with an incremental transmitter which triggers a signal to switch off and/or to reverse the door drive motor on overshooting a defined time interval between the increments read in from the incremental transmitter encoder.

2. The method for controlling an electrical door drive as claimed in claim 1, wherein the door drive motor is switched off when the following conditions occur at the same time:

a demand to close or open the door is provided, the door is not at an end position, and no increments are detected by the incremental transmitter encoder within a defined time.

3. The method for controlling an electrical door drive as claimed in claim 2, wherein the door drive motor is switched off as soon as no increments are detected by the encoder within a variable time from 100 ms to 300 ms.

4. The method for controlling an electrical door drive as claimed in claim 3, wherein the process of switching off the door drive motor that is initiated via the pulse monitoring is subordinate to door drive motor being switched off via the door drive torque.

* * * * *